Feb. 20, 1940.   R. B. PEALER   2,191,191
POWER UNIT
Filed Jan. 18, 1939   3 Sheets-Sheet 1

INVENTOR.
Robert B. Pealer,
BY Bates, Goldrick & Teare,
ATTORNEYS.

Patented Feb. 20, 1940

2,191,191

UNITED STATES PATENT OFFICE 2,191,191

POWER UNIT

Robert B. Pealer, Warren, Ohio, assignor to Beaver Pipe Tools, Inc., Warren, Ohio, a corporation of Ohio Application January 18, 1939, Serial No. 251,510

8 Claims. (Cl. 10—89)

This invention relates to a power unit comprising a driving motor, a driven chuck, and intermediate reduction gearing.

One of the objects of the invention is to provide a device of the character mentioned, arranged in a very simple and compact form, and having ample power. My power unit is especially well adapted for rotating a pipe adapted to be acted on by a hand tool, as, for instance, a die stock or pipe cutter, while the pipe rotates. The invention provides a simple, compact and powerful unit contained in a frame of economical manufacture and formed for ready mounting on a bench, or otherwise, as desired.

More particularly, my invention provides a chuck carried on the forward end of a hollow barrel rotatably mounted in a separable frame alongside of reduction gearing within such frame driven by a motor carried by the frame. I am thus able to obtain the desired length of barrel for carrying the overhanging chuck without unduly lengthening the frame, and I am able to deliver the power from the gearing to the rotary barrel close to the chuck, thereby reducing torsional stresses.

Another feature of my invention is to provide the frame of the device in a form suitable for mounting on a bench, also for receiving pipe-like extension legs, whereby the power unit may make its own stand and be supported directly from the ground.

Other features of the invention will appear in the following detailed description of a preferred embodiment thereof, and from the claims, which set out the essential novel features.

Figure 1:
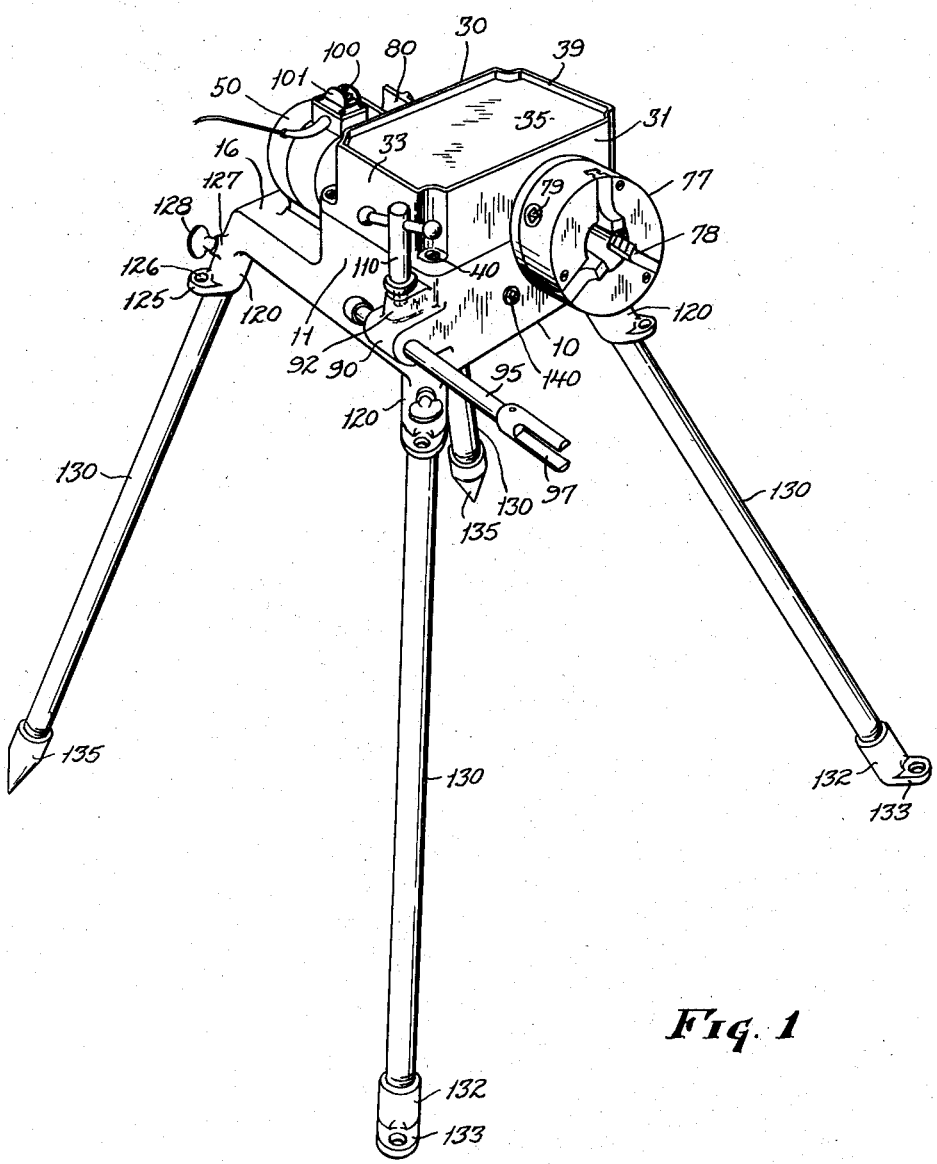
Figure 2:
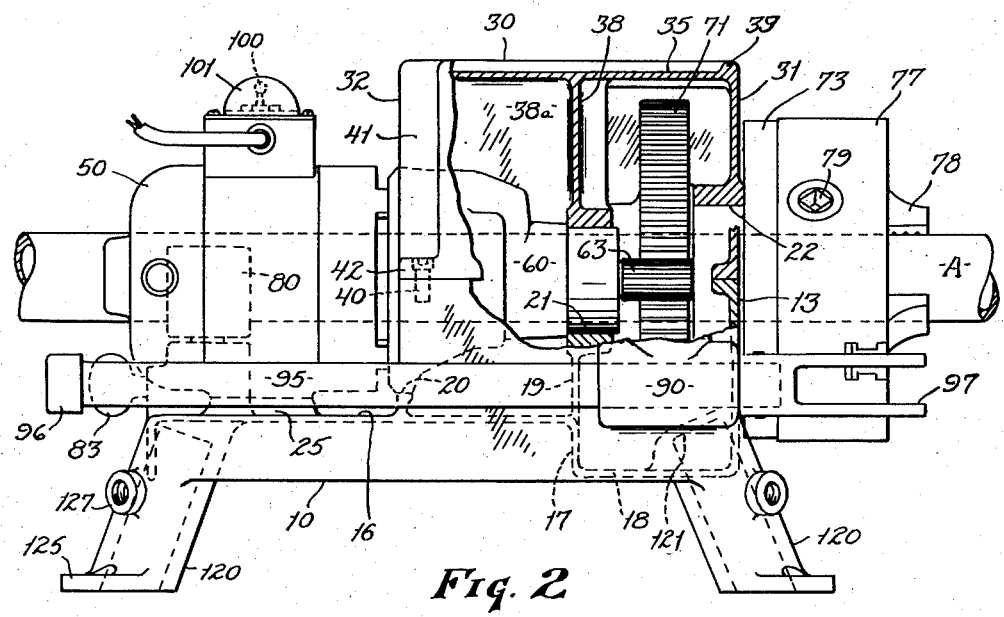
Figure 3:
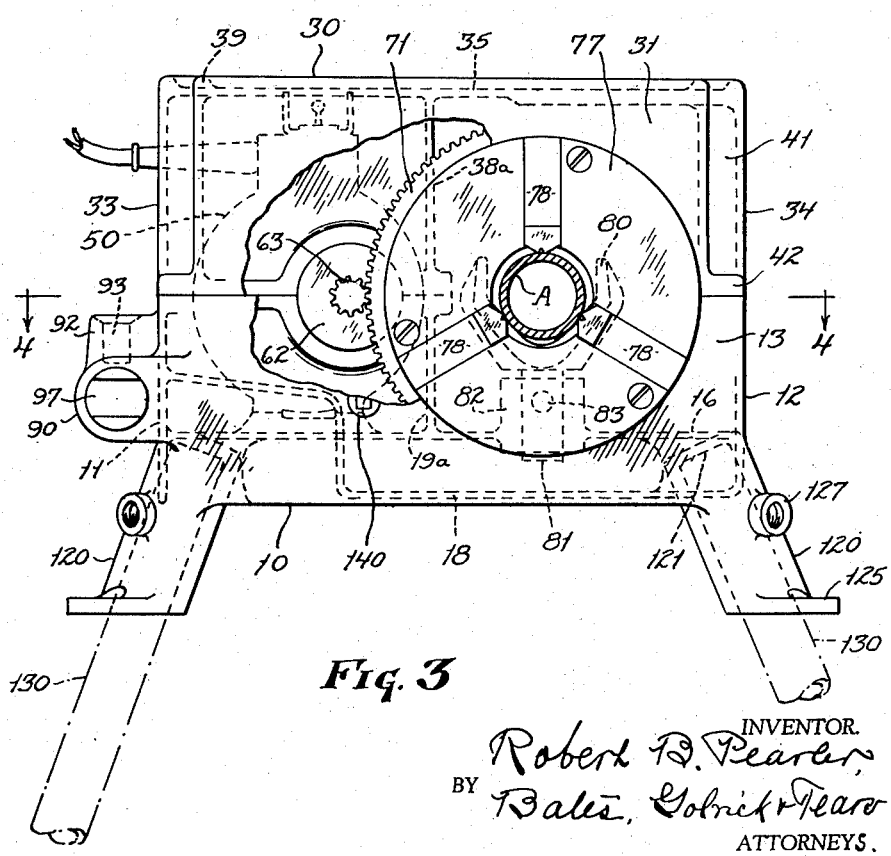
Figure 4:
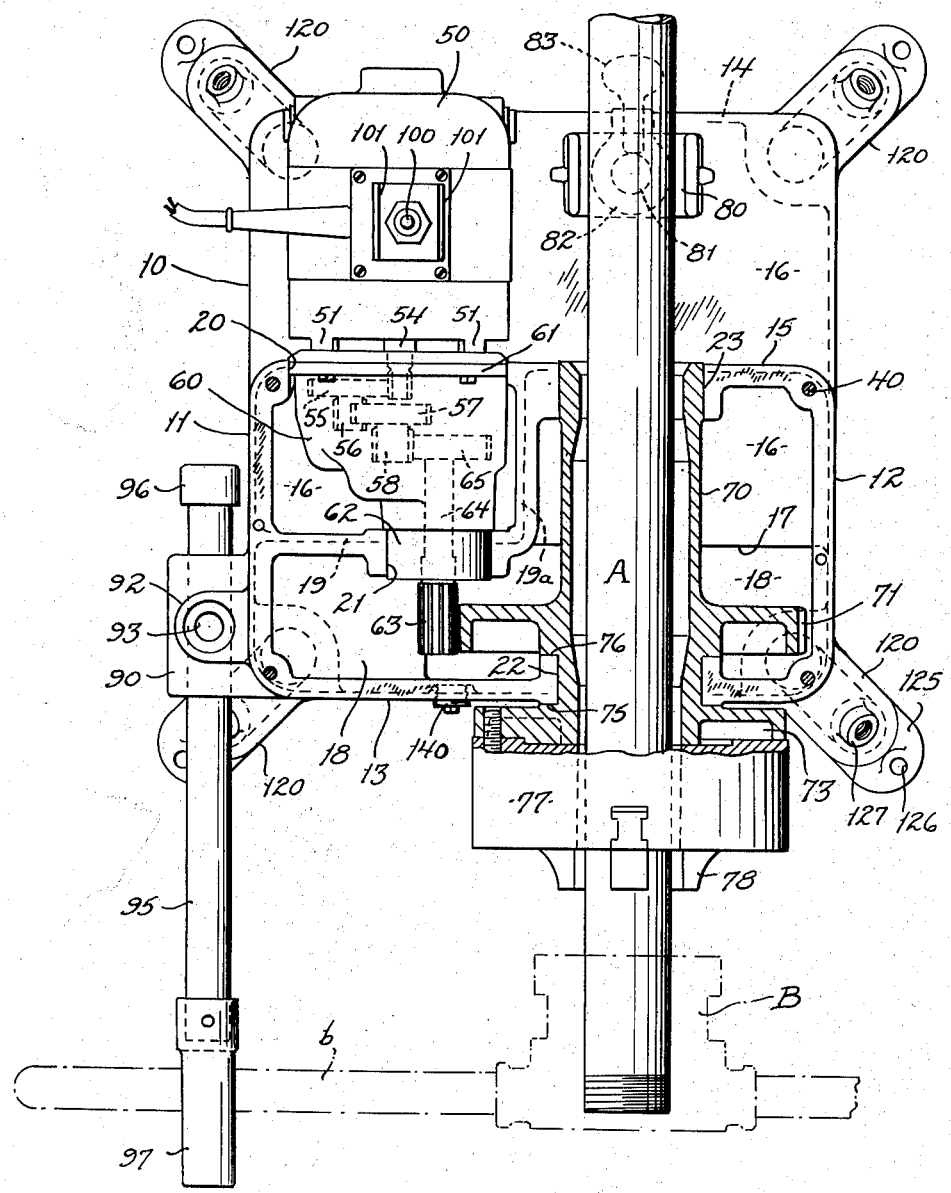

In the drawings, Fig. 1 is a perspective of my power unit supported on extension legs of its own; Fig. 2 is a sectional side elevation of the power unit with the extension legs removed, and thus adapted to stand on the bench; Fig. 3 is an end view partly broken away, of the power unit; Fig. 4 is a horizontal section through the power unit in a plane indicated by the line 4—4 on Fig. 3.

The frame of the power unit comprises essentially a base member 10 and a cap member 30 bolted thereto. These two parts carry a driving motor 50, the armature of which is connected to reduction gearing in a casing 60. The two frame parts also carry a chuck barrel 70, mounted parallel with the armature shaft and having a gear 71 meshing with the final pinion 63 of the reduction gearing. The chuck barrel carries at its far end a suitable chuck 77.

In use, a pipe A extends freely through the chuck barrel and is clamped by the chuck. In this position, the rear portion of the pipe is supported by a pipe rest 80, suitably carried by the frame behind the chuck barrel, and at the side of the motor.

The construction enables a rapidly rotating armature to rotate the pipe comparatively slowly, and with corresponding power. Such rotating pipe may be acted on by any suitable tool, as, for instance, a die stock B, indicated in broken lines in Fig. 4. The frame of the machine carries a sliding bar 95 which may engage the handle b of the die stock, as indicated in Fig. 4, and thus prevent the die stock from turning.

Taking up in detail the various parts of the machine, the base member 10 of the frame comprises a single casting having side walls 11 and 12, a front wall 13 and lower and upper rear walls 14 and 15.

One floor portion 16 of this base frame extends from the top of the end wall 14 to a region beyond the wall 15, where it joins to the top of an internal web 17. From the base of this web the floor portion 18 leads to the front end wall 13. Rising from the floor portion 16 and extending only part way across the base is another intermediate web 19, in substantially the vertical plane of the web 17, but extending only part way across the frame, where it is connected by a longitudinal web 19a with the rear wall 15.

Semi-circular depressions 20 in the wall 15 and 21 in the web 19 form seats for the reduction gear casing, and semi-circular depressions 22 and 33 in the walls 13 and 15, respectively, form bearings for the chuck barrel, all as hereinafter more fully described.

The cap member 30 of the frame is a hollow box-like member having end walls 31 and 32, side walls 33 and 34, and a top 35. This cap member has its bottom terminating in a plane and is adapted to rest on the top plane appearing in Fig. 4 of the base casting. When so positioned, the side walls 33 and 34 of the cap member align with the base walls 11 and 12 respectively, the wall 31 aligns with the base wall 13, and the wall 32 with the upper rear wall 15.

The cap walls 31 and 32 are formed with semi-circular recesses to match with the recesses 22 and 23, and thus complete the bearing for the chuck barrel 70. The rear wall 32 of the cap also has a semi-circular recess to coact with the recess 20 and clamp the rear end of the reduction gear casing. Within the cap member is a transverse web 38 and a longitudinal web 38a; which come directly above the base webs 19 and 19a respectively. The web 38 is formed with a semicircular recess to coact with the recess 21 in the base member and thus clamp the forward end of the reduction gear casing.

The cap member 30 is held to the base member by screws 40 passing from the cap into the base, the wall of the cap being turned back at each corner as shown at 41, leaving an ear 42 beneath such recess through which the screw passes into the base member. When these two frame members are bolted together by four corner screws, the frame is complete, and provides two aligned circular openings forming bearings for the chuck barrel, and circular openings forming clamps for the reduction gear casing.

The motor 50 has its field frame resting on a pad 25, formed on top of the outside floor portion 16 of the base frame. This field frame may be bolted to this pad by cap screws (not shown) extending upwardly from beneath the base into the field frame. The field frame terminates at its front end in spaced lugs 51 to which is bolted the reduction gear casing 60, the spaces between the lugs providing for ventilation of the motor.

The reduction gear casing 60 has two cylindrical portions 61 and 62 eccentrically positioned with reference to each other and adapted to occupy the circular openings 20 and 21 of the combined base and top frame and be clamped in position thereby. In this manner the motor and reduction gearing are held in definite position with its armature axis and the final pinion axis parallel to the chuck barrel axis.

Mounted in the reduction gear casing 60 of the motor frame, concentric of the casing portion 62, is the driven shaft 64, which carries the final pinion 63. This shaft is connected within the casing with the armature shaft 54 by suitable reduction gearing. As shown, the armature shaft carries a pinion meshing with a gear 55, carrying a pinion 56 which meshes with an idler gear 57, carrying a pinion 58 meshing with a gear 65 on the driven shaft 64, although other forms of reduction gearing may be employed if desired. The driven shaft 64 itself is preferably formed, beyond the casing 60, into the pinion 63 which meshes with the gear 71 on the chuck barrel 70.

The chuck barrel 70 is preferably a single integral member having a barrel portion provided at one end with an integral head 73, (preferably cored out for lightness), and some distance back of this is the gear 71, which is also integral with the barrel. The chuck barrel periphery between the head 73 and gear 71 is of a size to be properly journalled in the complete opening 22. Shoulders 75 and 76 on the head and gear coact with opposite sides of hollow bosses on the frame surrounding the opening 22 and thus form a thrust bearing, preventing axial movement of the chuck barrel while allowing it to rotate in its bearings 22 and 23.

Secured to the outer face of the chuck barrel head 73 is a suitable chuck 77 carrying readily movable jaws 78 arranged in the usual manner. These jaws may be actuated by an internal scroll plate (not shown) controlled by a rotatable pinion having a wrench socket 79 (Fig. 2).

To support the pipe back of the chuck barrel, preventing whipping action thereof, as the pipe is rotated, I provide directly behind the chuck barrel a pipe rest 80. This rest comprises a V-shaped member having a vertical stem 81 (Fig. 3) occupying a vertical opening in a hollow boss 82, carried by the base member of the frame. A set screw 83 screwing into this boss and clamping the stem of the raisable member adjusts the pipe rest according to the size of pipe to be chucked.

Formed integral with the base frame 10, at one side thereof, is a boss 90 having a horizontal bore therein which is slidably occupied by the rod 95. This rod is formed at its rear end with a suitable cap 96, and at its forward end with a fork 97 (which may be a separate member pinned to the rod). This fork is adapted to receive the handle of a die stock, as indicated by handle b in Fig. 4, and thus prevent the die stock rotating as the same is threaded onto the projecting end of the pipe, while the pipe is rotated by the chuck within the die stock barrel and is thus cut by the chasers of the die stock.

By sliding the rod 95 in the supporting boss 90 it may be shoved back normally out of the way, as illustrated in Fig. 2, but when in use, it may be drawn forward as shown in Figs. 1 and 4, to receive the die stock handle.

The motor is of the reversible type, and may be driven in either direction, or stopped according to the position of a switch 100, shown as mounted on top of the motor between two protecting walls 101. By reason of the fork 97 receiving the handle of the die stock, the same will be held against rotation whenever the motor is turned on for either forward or reverse movement. Hence, danger of the die stock handle swinging around and inadvertently hitting the operator is avoided.

The same frame projection 90 which carries the positioning rod 95 may also removably support a chuck wrench. To this end, I form a flattened top portion 92 of the boss 90 in which is a recess 93, in which the lower end of the chuck wrench 110 may be mounted, and which thus serves to support the wrench, as illustrated in Fig. 1. The wrench is therefore at all times available and ready for operation on the chuck socket 79.

I have described the construction of the frame without reference to its manner of support. However, provision for supporting of the frame alternatively on a bench or otherwise is one of the features of this invention, as about to be described.

In each corner of the base frame 10 I form integral with such frame a downwardly extending tubular leg 120. The legs project out laterally and longitudinally, as shown in the different views. Each leg is substantially cylindrical and has a cylindrical socket within it. At the top the leg merges with the side and end walls of the casing 10, and there is preferably an internal web 121, across the top end of the bore. The lower end of the leg has a horizontal lip 125 which extends laterally and longitudinally, and is provided with an opening 126 for a securing bolt.

The frame construction as just described, provides for mounting the device on a bench or other horizontal support, with feet 125 on the legs 120 furnishing means for conveniently securing the tool to a bench.

Should it be desired to support the power unit at an elevation independently of the bench, that is readily accomplished by inserting four diagonal extension legs 130 into the sockets of the legs 120. These sockets are preferably of a proper size to receive with desired snugness pipe sections of standard size. When inserted, such pipe sections may be clamped by set screws 128, screwed through threaded tubular bosses 127, formed on the legs as shown.

I may provide suitable foot members for the supporting pipes 130, which may be conveniently screwed onto the lower ends of such pipes. As shown in Fig. 1, the foot members 132 for the front pipe legs are formed with perforated ears 133, by which they may be bolted to a horizontal beam or other support. The rear pipe legs 130 are shown adapted with foot members 135 which are formed into downwardly projecting points adapted to press into a wooden support sufficiently to hold the device in place. I find this a convenient form of foot member, although other forms may be employed, if desired.

My power unit may be readily oiled by removing a plug 140 in the end wall 13 of the base member and supplying oil nearly to the level of the plug opening. Such oil stands primarily in the portion of the casing into which the chuck barrel gear 71 depends. Such gear will thus elevate and splash sufficient oil to maintain the bearings of the chuck barrel and the driving pinion well oiled.

I have referred to the flat top 35 of the cap member 30 of the frame. This flat top is preferably surrounded by an edge bead 39, thus providing a convenient support for placing an oil can or any other tool which one may desire. The flat top may also be provided with holes for the attachment of a pipe vise, should it be desired.

It will be seen from the description given that my power unit is very simple in construction, the frame consisting of merely two members with suitable bolts. By arranging the chuck barrel and reduction gearing construction so that they overlap each other, great compactness is secured. The chuck barrel is long to give it ample bearing to support the overhanging chuck, and the chuck gear is close to the chuck to reduce the torsional strains, and that gear, with the chuck carrying head, form of themselves the thrust bearing for the chuck barrel.

The simultaneous clamping of the motor and reduction gearing and the chuck barrel by merely securing the cap member in place, results in assuring the alignment of the pinion and chuck gear, as they are both held by bearings made parallel with each other in the combined casing.

By arranging the closed casing about the reduction gearing and providing packing rings or washers for the driving pinion and driven shaft, I may pack the entire reduction gear in grease. This reduction gearing may be of the spur gear type, and thus highly efficient. By reason of this reduction gearing and the large reduction between the driving pinion and the chuck gear, I may obtain a total reduction of approximately 300:1, whereby a comparatively small, high-speed motor may give the desired speed of rotation to the chuck barrel with ample power.

The arrangement of an exposed floor of the frame behind the housing for the chuck barrel and reduction gear provides for carrying the motor in a very convenient manner, allowing ready ventilation of it. The switch may be carried by the motor frame and still be readily accessible. By mounting the pipe rest in the space back of the motor and beyond the barrel, I form an effective and properly aligned support for the pipe without increasing the frame space. The retaining bar for the die stock handle is out of the way, at the side of the casing, and when the machine is idle it need not project beyond the chuck. The adaptability of the frame for bench mounting, or for carrying its own extension legs for outdoor mounting, is also a feature contributing to the utility of the device.

Finally, my two-part frame is designed with reference for accomplishing its function with a very small amount of machining. After the meeting surfaces of the two frame members have been planed off, and those members bolted together, the bearings for the chuck barrel may be made by a boring operation, with a single tool, both bearings being preferably the same diameter. The recesses in the two-part casing which receive the gear casing near the exposed pinion may likewise be bored, while the frame parts are secured together, by a tool carried by a spindle passing through the larger opening which, when in use, positions the other end of the gear casing.

I claim:

1. A power unit having a two-part frame comprising a base member and a cap member secured together, the base member having upright wall portions and a floor portion outside of the wall portion, the cap member having wall portions registering with the wall portions of the base member, a motor and gear-reduction unit comprising a motor frame secured to the outside floor portion of the base member, a reduction gear driven by the armature of the motor, a casing forming bearings for the reduction gearing, said casing being mounted in walls and intermediate webs of the base and cap members, a chuck barrel mounted in opposite mating walls of the base and cap members, said chuck barrel having a gear connected to the reduction gearing mentioned, and an external chuck carried by the chuck barrel.

2. A power unit having a two-part frame comprising a base member and a cap member secured together, the base member having an upwardly facing housing portion and a horizontal floor portion outside of the housing portion, the cap member registering with the housing portion of the base member, a motor and gear reduction unit comprising a motor frame secured to the floor portion of the base member beyond the housing and cap, reduction gearing driven by the armature of the motor, a casing forming bearings for the reduction gearing, said casing being mounted in a rear wall and an intermediate wall of the base and cap members, a chuck barrel mounted in front and rear wall of the base and cap members, said chuck barrel having a gear connected to the reduction gearing mentioned and a pipe rest mounted on the floor portion of the base member beyond the end of the chuck barrel and behind the field frame of the motor, and a chuck carried by the chuck barrel.

3. A power unit having a frame comprising a base member and a cap member secured thereto, the base member having side walls, front and rear walls, an internal upright web and a floor extending at one elevation from the front wall to the web and at a higher elevation from the web beneath the said rear wall and beyond it, thus providing a housing portion and an exposed floor behind it, the cap member registering with the walls of the base member, the internal web of the base member extending from one side wall only part way to the other and connected at its inner end by a longitudinal interior web with the second rear wall, the cap member having internal webs registering with the internal webs of the base member, a chuck barrel mounted in the front and rear walls of the base member and in the registering walls of the cap member, a motor carried by the base member back of said rear wall, and reduction gearing driven by the motor mounted in a casing carried by the rear walls and internal webs of the base and cap member, the reduction gearing meshing with a gear on the chuck barrel in the region between the front wall and the internal web.

4. A power unit comprising a frame, a rotatable chuck barrel carried by the frame, a motor, reduction gearing connecting the motor with the chuck barrel, a chuck on the front end of the chuck barrel and a rod slidably mounted on the side of the frame and carrying a fork at its forward end adapted to embrace the handle of a die stock on a projecting pipe carried in the barrel and chuck.

5. A power unit having a two-part frame comprising a base member and a cap member secured together, the base member having upright wall portions and horizontal floor portions both within and outside of the wall portions, the cap member having a top portion and vertical wall portion registering with the wall portions of the base, a chuck barrel journalled in opposite walls of the base and cap members, a motor having its frame secured to the floor portion of the base member beyond the vertical walls mentioned, reduction gearing driven by the armature of the motor, a casing forming bearings for the reduction gearing, said casing being secured to the motor in a manner to leave ventilation openings between them, and mounted in mating walls of the base and cap members, with the ventilation openings behind the frame walls, said chuck barrel having a gear connected to the reduction gearing mentioned, and a chuck carried by the chuck barrel.

6. In a power unit, the combination of a two-part frame comprising a base member and a cap member secured together, a chuck barrel journalled in mating semi-cylindrical recesses in the two members of the frame, said chuck barrel having a chuck-carrying head outside of the frame and a gear inside the frame, the barrel, head and gear being one integral unit and the head and gear coacting with the frame to form thrust bearings for the barrel, a motor carried by the frame, reduction gearing driven by the motor terminating in a pinion within the frame meshing with the gear on the chuck barrel.

7. In a power unit, the combination of a frame having a base member with an upstanding housing portion and a projecting portion, a cap member adapted to be secured to the housing portion, a chuck barrel having its bearings in recesses in the two members of the frame and carrying a chuck outside of the frame and a gear inside of the frame, a motor mounted on the frame outside of the housing portion with its armature axis parallel with the chuck barrel axis, a casing secured to the frame of the motor and extending into the frame of the power unit, a gear reduction unit mounted in said casing and driven by the motor, the final member of said gear reduction unit being a pinion driving the gear of the chuck barrel.

8. A power unit comprising a frame, a rotatable chuck barrel carried by the frame, a motor, reduction gearing connecting the motor with the chuck barrel, a chuck on the front end of the chuck barrel and a rod slidably mounted upon the frame and carrying means having opposing surfaces adapted to engage either side of the handle of a die stock when mounted on a projecting pipe carried in the barrel and chuck and prevent the die stock from rotating with the barrel in either direction.

ROBERT B. PEALER.